UNITED STATES PATENT OFFICE.

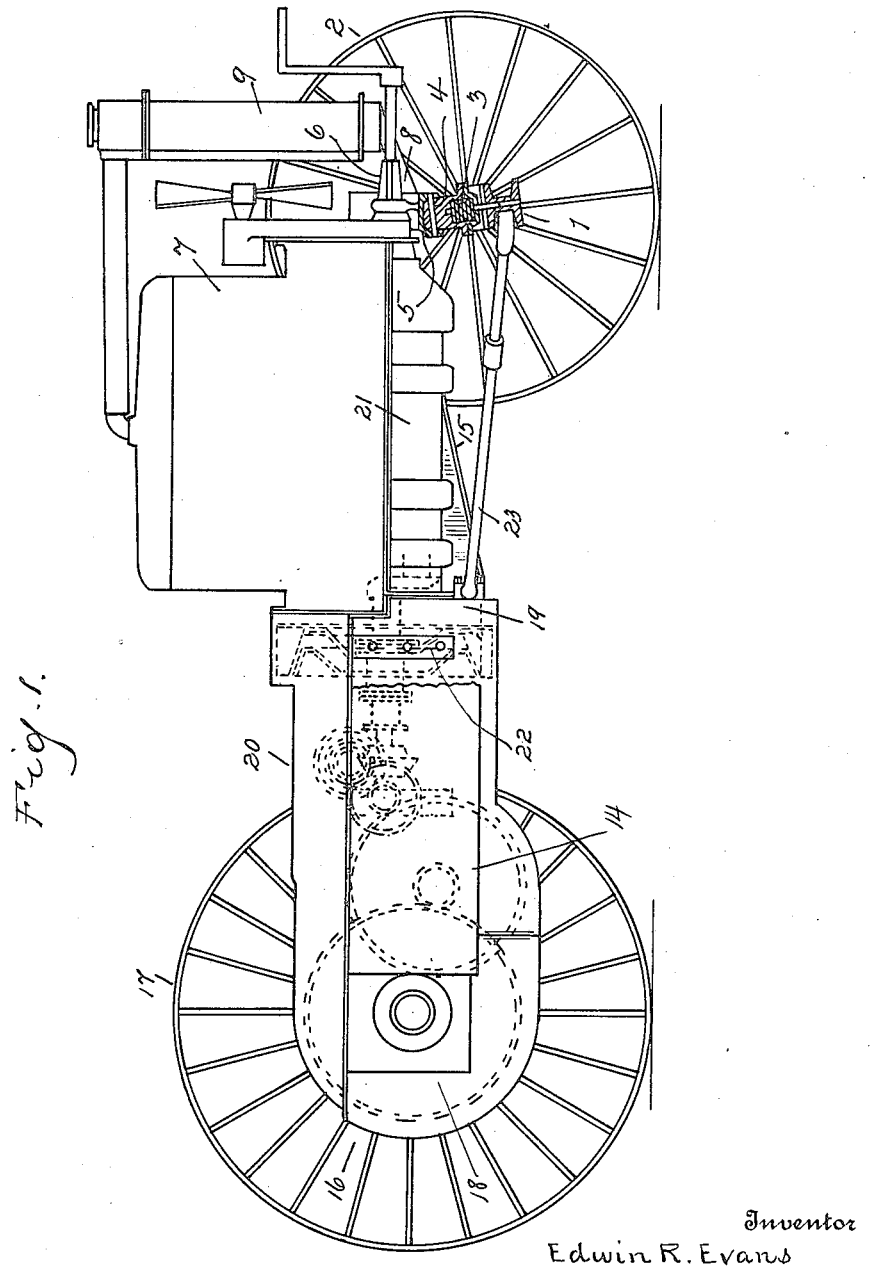

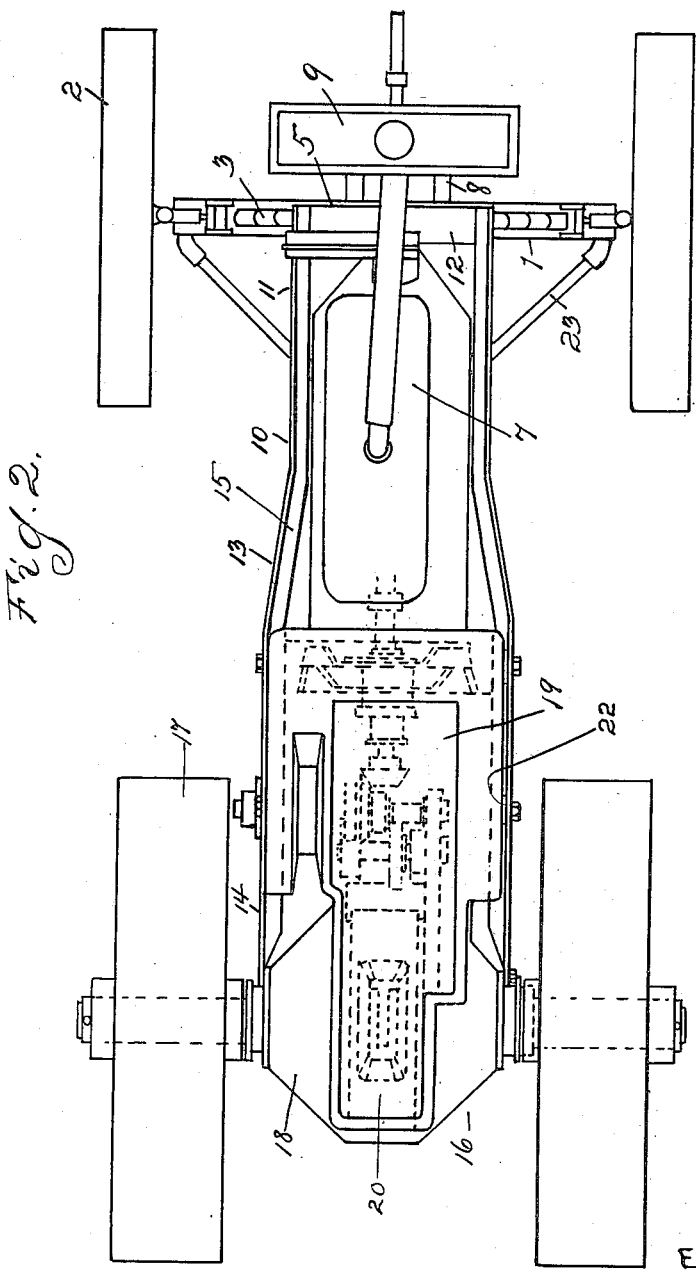

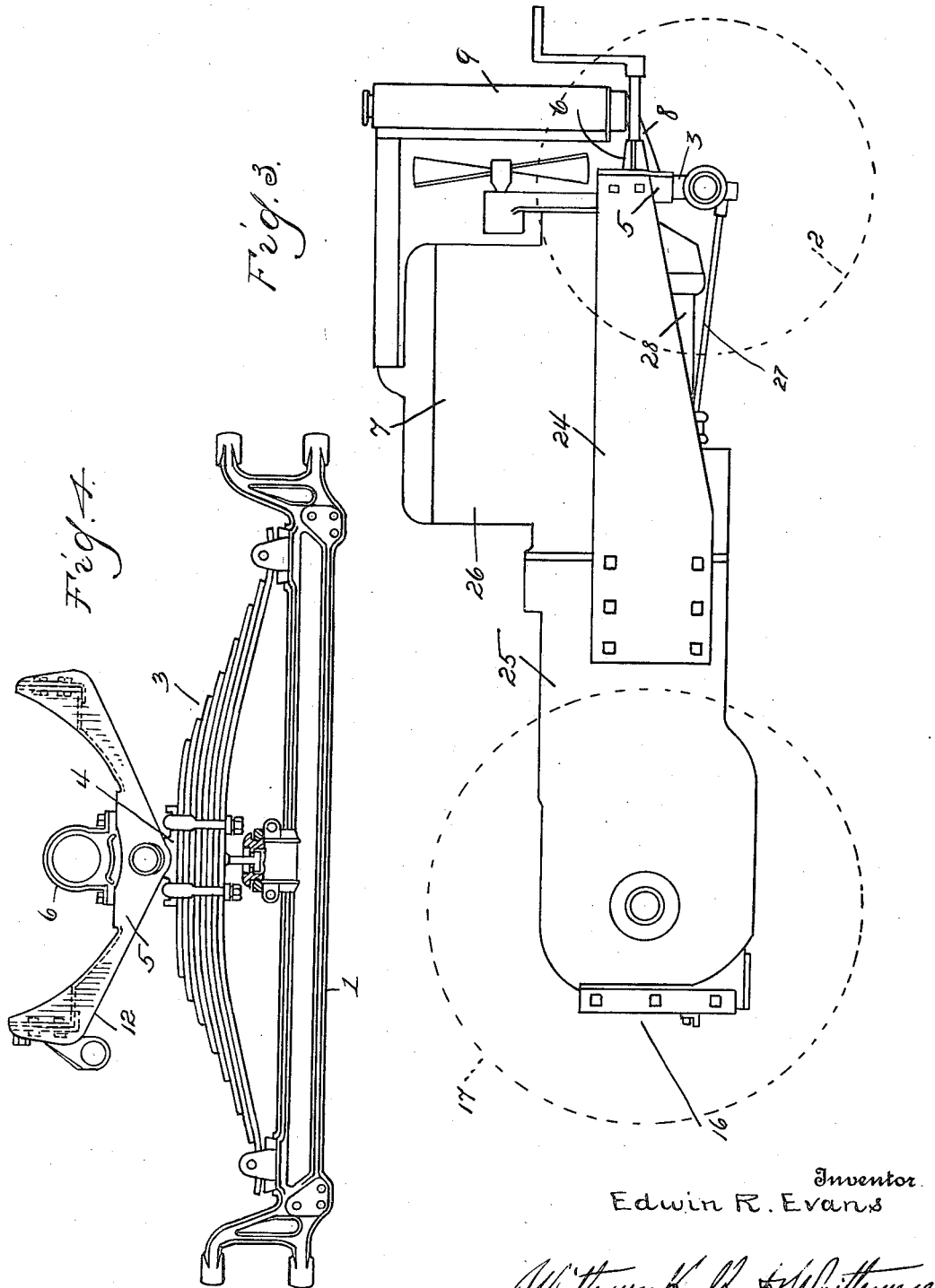

EDWIN R. EVANS, OF DETROIT, MICHIGAN, ASSIGNOR TO BYRON F. EVERITT, OF DETROIT, MICHIGAN.

TRACTOR-CHASSIS.

1,323,849. Specification of Letters Patent. Patented Dec. 2, 1919.

Application filed February 20, 1919. Serial No. 278,267.

*To all whom it may concern:*

Be it known that I, EDWIN R. EVANS, a citizen of the United States of America, residing at Detroit, in the county of Wayne and State of Michigan, have invented certain new and useful Improvements in Tractor - Chassis, of which the following is a specification, reference being had therein to the accompanying drawings.

The invention relates to a chassis which is adapted for use particularly in tractors having a unit construction of engine housing and transmission housing extending from the front to the rear axle. One object of the invention is to provide a construction in which the engine has a three-point suspension and in which there is means for relieving the engine of stresses. Other objects of the invention reside in the novel arrangements and combinations of parts as more fully hereinafter set forth.

In the drawings:

Figure 1 is a side elevation partly broken away and partly in section of a tractor embodying my invention;

Fig. 2 is a top plan view thereof;

Fig. 3 is a side elevation of a modified construction of tractor;

Fig. 4 is a front elevation thereof showing the mounting of the engine and chassis, this arrangement also applying generally to the tractor shown in Figs. 1 and 2.

1 is the front axle, upon the ends of which are mounted the ground steering wheels 2. 3 is the front spring upon the front axle provided with the hanger 4 at its center. 5 is the bolster pivotally mounted upon this hanger and carrying the bearing 6 which is pivotally engaged by the forward end of the engine housing 7. The bolster pivot is vertically below and as near the engine housing pivot as possible. This bolster also carries the brackets 8 for supporting the radiator 9.

The chassis frame has the frame members 10 the forward ends 11 of which are disposed in parallelism and connected to the ends of the lateral arms 12 of the bolster 5. These frame members have the rearwardly extending diverging portions 13 and parallel portions 14, thereby providing a chassis frame that is wider at the rear end than at the forward end. The frame members are somewhat in the form of side plate girders and their rear ends are of a greater depth than their forward ends, as best shown in Fig. 1. The frame members have the lower edges thereof provided with inturned stiffening flanges 15, which flanges add rigidity to the frame members and in some instances serve as ledges or supports for parts of the tractor.

16 generally designates the rear axle construction which includes the traction wheels 17 and the differential housing 18, this differential housing being part of the transmission housing 19 which abuts the rear end of the engine housing 7. A portion of the transmission housing extends under a portion of the engine housing and thereby assists in supporting the same. The cover 20 is provided for the transmission housing including the differential housing.

The differential housing 18 contains suitable differential mechanism and the transmission housing 19 contains suitable transmission mechanism which is driven from the engine through a clutch, this housing together with its cover 20 being rigidly connected to the engine housing 7, which includes the crank case 21 so that these parts of the tractor form a rigid body or unit construction extending from the front axle to the rear axle. The transmission housing 19 has the sides thereof provided with suitable bossed portions 22 where it may be connected to the frame members 10 of the chassis and in consequence of this arrangement the frame members are tied to the longitudinal stiff body of the tractor intermediate its ends.

Radius rods 23 are also employed to establish a defined relation between the forward end of the transmission housing 19 and the front axle 1 without interfering with the tilting of the front axle with respect to the unit construction of engine and transmission housing.

As shown in Fig. 3, the arrangement of parts is the same as that shown in Figs. 1 and 2 with the exception that the chassis frame members 24 extend from the bolster 5 rearwardly and are connected at their rear ends to the forward portion of the transmission housing 25, which housing makes with the engine housing 26 a straight vertical joint. Also the radius rods 27 are connected at their rear ends to the crank case 28 of the engine housing 26.

From the above description it will be readily seen that I have provided a construction in which the engine and transmission housings form a rigid or unit construction extending from the front to the rear axle, which is furthermore of the three-point suspension type. Also the engine housing has a three-point suspension due to the fact that the forward end of the engine housing is pivotally mounted over the front axle. Another very important feature is that the chassis frame members are rigidly secured to the transmission housing and have their forward ends mounted upon the front axle, these frame members being independent of the engine housing. Furthermore, their forward ends are mounted upon a bolster which is pivotally mounted over the forward axle at a point beneath and adjacent to the pivotal mounting for the engine housing so that the frame members with the transmission housing form the reach connection between the rear and front axles and also carry the torque stresses, thereby relieving the engine of the same.

What I claim as my invention is:

1. In a tractor, the combination with an axle and an engine housing supported upon said axle, of a drive axle, a transmission housing supported upon said drive axle and rigidly secured to said engine housing, and a chassis frame member rigidly secured to one of said housings and mounted upon the axle upon which the other housing is mounted.

2. In a tractor, the combination with an axle and an engine housing pivotally supported upon said axle, of a drive axle, a transmission housing mounted upon said drive axle and rigidly secured to said engine housing, and a chassis frame member rigidly secured to said transmission housing and supported upon said first mentioned axle, said chassis frame member being independent of said engine housing.

3. In a tractor, the combination with an axle and a drive axle, of an engine housing pivotally mounted upon said axle, a transmission housing supported upon said drive axle and directly secured to said engine housing, said housings forming a unit construction from axle to axle, and a chassis member rigidly secured to said transmission housing intermediate said axles and extending to and pivotally supported on said first-mentioned axle, said chassis member being independent of said engine housing and the pivot for the chassis member being in vertical alinement therewith and adjacent thereto.

4. In a tractor, the combination with a front and a rear axle, of a continuous housing extending between and supported on said axles, and a frame member rigidly secured to said housing intermediate said axles and extending to and supported on one of said axles independent of the portion of said housing between said last-mentioned axle and the point of connection of the housing to the frame member.

5. In a tractor, the combination of a rear axle, a front axle, a bolster supported on said front axle, a transmission housing mounted upon said rear axle, an engine housing mounted upon said bolster and rigidly secured to said transmission housing, and chassis frame members having the forward ends thereof connected to said bolster and the rear ends thereof connected to said transmission housing to provide a rigid longitudinal body between the front and rear axles.

6. In a tractor, the combination of a rear axle construction including a differential casing, a front axle construction, a bolster supported on said front axle construction, web plate chassis frame members having the forward ends thereof mounted on said bolster and the rear ends thereof connected to the sides of said differential casing, a power plant having the forward end thereof supported from said bolster, a crank case connected to said power plant, a transmission casing connecting said differential casing to the rear ends of said power plant and crank case, said transmission and differential casings having portions bearing on said chassis frame members, and means connecting said transmission casing to said chassis frame member.

7. In a tractor, the combination of a rear axle construction including a differential casing, a front axle construction, a bolster supported on said front axle construction, chassis frame members having the forward ends thereof connected to said bolster and the rear ends thereof connected to the differential casing of said rear axle construction, said chassis frame members being in the form of web plate girders having the rear ends thereof of greater depth than the forward ends, and a rigid body including a power plant connecting the differential casing of the rear axle construction to the bolster of the front axle construction.

8. In a tractor, the combination of a front axle, an engine having the forward end thereof supported above said front axle, a rear axle, a differential casing at said rear axle, chassis frame members having the forward ends thereof supported above said front axle and the rear ends thereof connected to said differential casing, and a transmission casing engaging said chassis frame members, and connecting said engine and differential casing with a portion of said transmission casing supporting the rear end of said engine.

9. In a tractor, the combination with front and rear axles, of a housing between said axles and supported thereon, and a reinforcing member connected to said housing intermediate its ends and extending to and supported on one of said axles.

In testimony whereof I affix my signature.

EDWIN R. EVANS.